United States Patent
Previdi et al.

(10) Patent No.: US 7,693,043 B2
(45) Date of Patent: Apr. 6, 2010

(54) METHOD AND APPARATUS FOR ADVERTISING REPAIR CAPABILITY

(75) Inventors: Stefano Benedetto Previdi, Rome (IT); Ian Michael Charles Shand, Cobham (GB); Stewart Frederick Bryant, Redhill (GB)

(73) Assignee: Cisco Technology, Inc., San Jose, CA (US)

( * ) Notice: Subject to any disclaimer, the term of this patent is extended or adjusted under 35 U.S.C. 154(b) by 612 days.

(21) Appl. No.: 11/188,221

(22) Filed: Jul. 22, 2005

(65) Prior Publication Data

US 2007/0041379 A1     Feb. 22, 2007

(51) Int. Cl.
G01R 31/08 (2006.01)
H04L 12/56 (2006.01)
G06F 15/173 (2006.01)

(52) U.S. Cl. .................. 370/216; 370/392; 370/227; 370/242; 709/239; 709/242

(58) Field of Classification Search ............... 370/216, 370/218–220, 221, 238–241, 217, 392, 241.1, 370/242, 227–228, 252
See application file for complete search history.

(56) References Cited

U.S. PATENT DOCUMENTS

| | | | |
|---|---|---|---|
| 5,243,592 A | 9/1993 | Perlman et al. | |
| 5,430,727 A | 7/1995 | Callon | |
| 5,959,968 A | 9/1999 | Chin et al. | |
| 6,018,576 A * | 1/2000 | Croslin | 379/22.03 |
| 6,032,194 A * | 2/2000 | Gai et al. | 709/239 |
| 6,111,257 A | 8/2000 | Shand et al. | |
| 6,148,410 A | 11/2000 | Baskey et al. | |
| 6,295,275 B1 | 9/2001 | Croslin | |
| 6,321,271 B1 | 11/2001 | Kodialam et al. | |
| 6,343,122 B1 | 1/2002 | Andersson | |
| 6,349,091 B1 | 2/2002 | Li | |
| 6,473,421 B1 | 10/2002 | Tappan | |
| 6,507,577 B1 | 1/2003 | Mauger et al. | |
| 6,690,671 B1 | 2/2004 | Anbiah et al. | |

(Continued)

FOREIGN PATENT DOCUMENTS

CN     1440159 A     9/2003

(Continued)

OTHER PUBLICATIONS

A. Atlas, "Basic Specification for IP Fast Reroute: Loop-free Alternates," draft-ietf-rtgwg-ipfrr-spec-base-03.txt, internet-drafts of the ietf.org, dated Feb. 21, 2005, 20 pgs.

(Continued)

*Primary Examiner*—Kwang B Yao
*Assistant Examiner*—Candal Elpenord
(74) *Attorney, Agent, or Firm*—Hickman Palermo Truong & Becker LLP

(57) ABSTRACT

A method of advertising repair capability in a network repair scheme using network repair addresses for repairing around a repairable network component in a data communications network having, as components, nodes and links therebetween, comprises establishing whether an alternate repair path is available around a repairable component. If such a repair path is available, the method further comprises issuing a corresponding notification to nodes in the network.

27 Claims, 5 Drawing Sheets

U.S. PATENT DOCUMENTS

| | | | |
|---|---|---|---|
| 6,697,325 | B1 | 2/2004 | Cain |
| 6,697,333 | B1* | 2/2004 | Bawa et al. .................. 370/238 |
| 6,714,551 | B1 | 3/2004 | Le-Ngoc |
| 6,724,722 | B1 | 4/2004 | Wang et al. |
| 6,744,727 | B2* | 6/2004 | Liu et al. .................... 370/228 |
| 6,944,131 | B2 | 9/2005 | Beshai et al. |
| 6,990,068 | B1* | 1/2006 | Saleh et al. .................. 370/225 |
| 7,058,016 | B1 | 6/2006 | Harper |
| 7,158,486 | B2* | 1/2007 | Rhodes ........................ 370/256 |
| 7,177,295 | B1 | 2/2007 | Sholander et al. |
| 7,242,664 | B2 | 7/2007 | Einstein et al. |
| 7,260,645 | B2 | 8/2007 | Bays |
| 7,274,654 | B2 | 9/2007 | Yang et al. |
| 7,274,658 | B2 | 9/2007 | Bornstein et al. |
| 7,490,165 | B1 | 2/2009 | Katukam et al. |
| 2002/0093954 | A1* | 7/2002 | Weil et al. ................... 370/389 |
| 2002/0112072 | A1 | 8/2002 | Jain |
| 2002/0131362 | A1 | 9/2002 | Callon |
| 2002/0171886 | A1 | 11/2002 | Wu et al. |
| 2003/0063613 | A1* | 4/2003 | Carpini et al. ............... 370/401 |
| 2003/0161338 | A1 | 8/2003 | Ng et al. |
| 2003/0193959 | A1 | 10/2003 | Lui et al. |
| 2003/0233595 | A1 | 12/2003 | Charny et al. |
| 2004/0001497 | A1 | 1/2004 | Sharma |
| 2004/0071089 | A1 | 4/2004 | Bauer et al. |
| 2004/0088429 | A1 | 5/2004 | Luo |
| 2004/0190454 | A1* | 9/2004 | Higasiyama ................. 370/238 |
| 2004/0203827 | A1 | 10/2004 | Heiner et al. |
| 2004/0205239 | A1 | 10/2004 | Doshi et al. |
| 2005/0007950 | A1* | 1/2005 | Liu .............................. 370/221 |
| 2005/0097219 | A1 | 5/2005 | Goguen et al. |
| 2005/0201273 | A1* | 9/2005 | Shimizu ...................... 370/216 |
| 2005/0281271 | A1 | 12/2005 | Beshai et al. |
| 2006/0031482 | A1* | 2/2006 | Mohan et al. ................ 709/224 |
| 2006/0050630 | A1* | 3/2006 | Kobayashi et al. .......... 370/216 |
| 2006/0092941 | A1* | 5/2006 | Kusama ....................... 370/392 |
| 2006/0140190 | A1 | 6/2006 | Lee |
| 2006/0291446 | A1 | 12/2006 | Caldwell et al. |
| 2007/0011351 | A1 | 1/2007 | Bruno et al. |
| 2007/0038767 | A1 | 2/2007 | Miles et al. |
| 2008/0317055 | A1 | 12/2008 | Zetterlund et al. |
| 2009/0129771 | A1 | 5/2009 | Saniee et al. |

FOREIGN PATENT DOCUMENTS

| | | |
|---|---|---|
| WO | WO 02/06918 | 1/2002 |

OTHER PUBLICATIONS

P. Francois, et al., "Autodiscovery Loop-free Alternates," draft-francois-protection-discovery-00.txt, internet-drafts of the ietf.org, dated Jun. 2005, 4 pgs.

S. Bryant, et al., "IP Fast Reroute using Notvia Addresses", internet-drafts of the ietf.org, dated Mar. 2005, 14 pgs.

AU Examiner's First Report for foreign patent application No. 2004311004 dated Jun. 23, 2008 (1 pg).

AU Examiner's Second Report for foreign patent application No. 2004311004 dated Aug. 18, 2008 (1 pg).

Current claims for AU foreign patent application No. 2004311004 (6 pgs).

Office Action from CN for foreign application No. 200480033007.8 dated Apr. 11, 2008 (10 pgs) with English translation (11 pgs).

Current claims for CN foreign patent application No. 200480033007.8 (6 pgs).

European Patent Office, "Supplementary European Search Report", application No. EP 04795045, May 27, 2009, 4 pages.

Claims, application No. EP 04795045, 4 pages.

Raju et al., "A New Approach to On-Demand Loop-Free Multipath Routing", Computer Communications and Networks, 1999, IEEE, Oct. 1999, XP010359531, ISBN: 978-0-7803-5794-5, 6 pages.

State Intellectual Property Office of the People'S Republic of China, "The First Office Action", filing No. 200680001652.0, May 8, 2009, 15 pages.

Claims, filing No. 200680001652.0, 4 pages.

European Patent Office, "Supplementary European Search Report", application No. EP 06720965, dated Jul. 21, 2009, 6 pages.

Claims, application No. EP 06720965, 4 pages.

European Patent Office, "Communication pursuant to Article 94(3) EPC", Application No. 04795045.6-2416, dated Sep. 7, 2009, 5 pages.

Current Claims, Application No. 04795045.6-2416, 5 pages.

European Search Report received in Application No. 05749440.3 dated Dec. 4, 2009 (3 pages).

Current Claims—Application No. 05749440.3 dated Jan. 2010 (3 pages).

* cited by examiner

| DESTINATION | NEXT HOP |
|---|---|
| B | Z |
| $B_{\bar{A}}$ | - |

FIG. 6

| DESTINATION | NEXT HOP |
|---|---|
| B | Z |
| $B_{\bar{A}}$ | Z |

FIG. 7

METHOD AND APPARATUS FOR ADVERTISING REPAIR CAPABILITY

FIELD OF THE INVENTION

The present invention generally relates to network repair. The invention relates more specifically to a method and apparatus for advertising network repair capability.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

In computer networks such as the Internet, packets of data are sent from a source to a destination via a network of elements including links (communication paths such as telephone or optical lines) and nodes (for example, routers directing the packet along one or more of a plurality of links connected to it) according to one of various routing protocols.

One class of routing protocol is the link state protocol. The link state protocol relies on a routing algorithm resident at each node. Each node on the network advertises, throughout the network, links to neighboring nodes and provides a cost associated with each link, which can be based on any appropriate metric such as link bandwidth or delay and is typically expressed as an integer value. A link may have an asymmetric cost, that is, the cost in the direction AB along a link may be different from the cost in a direction BA. Based on the advertised information in the form of a link state packet (LSP) or link state advertisement (LSA) dependent on the protocol each node constructs a link state database (LSDB), which is a map of the entire network topology, and from that constructs generally a single optimum route to each available node based on an appropriate algorithm such as, for example, a shortest path first (SPF) algorithm. As a result a "spanning tree" (SPT) is constructed, rooted at the node and showing an optimum path including intermediate nodes to each available destination node. The results of the SPF are stored in a routing information base (RIB) and based on these results the forwarding information base (FIB) or forwarding table is updated to control forwarding of packets appropriately. When there is a network change an LSP representing the change is flooded through the network by each node adjacent the change, each node receiving the LSP sending it to each adjacent node.

As a result, when a data packet for a destination node arrives at a node the node identifies the optimum route to that destination and forwards the packet via the corresponding interface to the next node ("NEXT_HOP") along that route. The next node repeats this step and so forth.

It will be noted that in normal forwarding each node decides, irrespective of the node from which it received a packet, the next node to which the packet should be forwarded. In some instances this can give rise to a "loop". In particular this can occur when the databases (and corresponding forwarding information) are temporarily de-synchronized during a routing transaction, that is, where because of a change in the network, a new LSP is propagated that induces creating a loop in the RIB or FIB. As an example, if a node A sends a packet to a node Z via a node B, comprising the optimum route according to its SPF, a situation can arise where node B, according to its SPF determines that the best route to node Z is via node A and sends the packet back. This can continue for as long as the loop remains although usually the packet will have a maximum hop count after which it will be discarded. Such a loop can be a direct loop between two nodes or an indirect loop around a circuit of nodes.

One solution that has been proposed to the looping problem is described in co-patent pending patent application Ser. No. 11/064,275 filed 22 Feb. 2005, entitled "Method and Apparatus for Constructing a Repair Path around a Non-Available Component in a Data Communications Network" of Michael Shand et al ("Shand et al"), the entire contents of which is incorporated by reference for all purposes as if fully set forth herein and as discussed in more detail below.

According to the repair scheme described in Shand et al, in addition to the standard IP addresses assigned to each router or node in a network, each interface is assigned an additional repair address termed, in Shand et al, the "notvia address". The semantics of a notvia address are that a packet addressed to a not via address must be delivered to the router with that address, not via the neighbouring router on the interface to which that address is assigned. All nodes in the network then calculate their next hop not only for each normal address but also for each notvia address. As a result, when a neighbour node to a component (link or node) identifies that the component has failed it tunnels packets which it would have otherwise sent to the failed component to the appropriate notvia address on the other side of the failure. As all other nodes have pre-calculated their own next hop for that notvia address then the tunneled packed will be forwarded correctly and decapsulated on arrival at the notvia address from where it is forwarded as normal. Accordingly, looping does not occur.

In order to optimise the method in Shand et al the computational burden of an additional SPF calculation for each notvia address is reduced by using incremental SPFs (ISPF). The ISPF approach is described in co-pending patent application Ser. No. 09/687,009, filed 12 Oct. 2000, entitled "Method and System for Accelerating Route Calculation in Link State Routing Protocols" of John Harper ("Harper"), the entire contents of which are incorporated by reference for all purposes as if fully set forth herein. ISPF recognizes that following a topology change, only the affected part of the SPT requires recomputation. Accordingly it is simply necessary to prune the affected component (whether node or link), identify which components have been detached from the SPT as a result and reattach those components. In a further optimization discussed in Shand et al the ISPF calculation is terminated when all notvia addresses have been reattached.

However the approach described in Shand et al still requires a significant amount of ISPF computation. A further optimization described in Shand et al can be understood with reference to FIG. 1 which depicts an illustrative network diagram of a network topology to which the optimization can be applied. A network generally referenced 100 included nodes A, B, C, D, E, F, X, Y, Z, reference numerals 102, 104, 106, 108, 110, 112, 114, 116, 118 respectively. Node B is joined to nodes A, C, D, E, via respective links 120, 122, 124, 126. Node C provides a route 128 to node F which may be a single or multiple hops. Node A is connected to node X via a route 130 which may also be single or multiple hops. Each node advertises, in addition to its normal address, a notvia address for each respective interface. For example as shown in FIG. 1, node b advertises notvia addresses $B_{\neg A}$, $B_{\neg C}$, $B_{\neg D}$, $B_{\neg E}$, in relation to its interfaces with respective nodes A, C, D, E. In addition it can be seen, for example, that nodes A, C, D and E advertise notvia addresses $A_{\neg B}$, $C_{\neg B}$, $D_{\neg B}$, $E_{\neg B}$ respectively.

According to normal notvia configuration as described in Shand et al, in relation to, for example, notvia address $B_{\neg A}$, advertised by node B, each other node in the network calculates its route to that notvia address. Then, if the link to the corresponding interface, connecting to node A, fails, packets arriving at node A with next hop node B are tunneled by node A to notvia address $B_{\overline{A}}$. As shown in FIG. 1, where link AB reference numeral 120, has failed, A tunnels packets along a notvia route designated generally 132 via nodes Y and Z to node B. Node B then decapsulates the tunneled packets which are then forwarded normally.

Accordingly it will be seen that in fact only the nodes Y and Z, i.e. those in the notvia repair path 132 in fact use the notvia address even though all nodes in the network have calculated their next hop for $B_{\overline{A}}$. According to an optimization proposed in Shand et al, only the nodes on the notvia repair path calculate their notvia addresses however this requires signaling to those nodes.

BRIEF DESCRIPTION OF THE DRAWINGS

The present invention is illustrated by way of example, and not by way of limitation, in the figures of the accompanying drawings and in which like reference numerals refer to similar elements and in which:

FIG. 6 shows an FIB for a constructing node;

FIG. 7 shows an MFIB for a constructing node; and

DETAILED DESCRIPTION OF THE PREFERRED EMBODIMENT

A method and apparatus for advertising repair capability is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Method of Advertising Repair Capability
4.0 Implementation Mechanisms—Hardware Overview
5.0 Extensions and Alternatives.

1.0 General Overview

The needs identified in the foregoing Background, and other needs and objects that will become apparent for the following description, are achieved in the present invention, which comprises, in one aspect, a method of advertising repair capability in a network repair scheme using network repair addresses for repairing around a repairable network component in a data communications network having, as components, nodes and links there between. The method comprises establishing whether an alternate repair path is available around a repairable component and, if such a repair path is available, issuing a corresponding notification to nodes in the network.

In other aspects, the invention encompasses a computer apparatus and a computer-readable medium configured to carry out the foregoing steps.

2.0 Structural and Functional Overview

Figure 1:
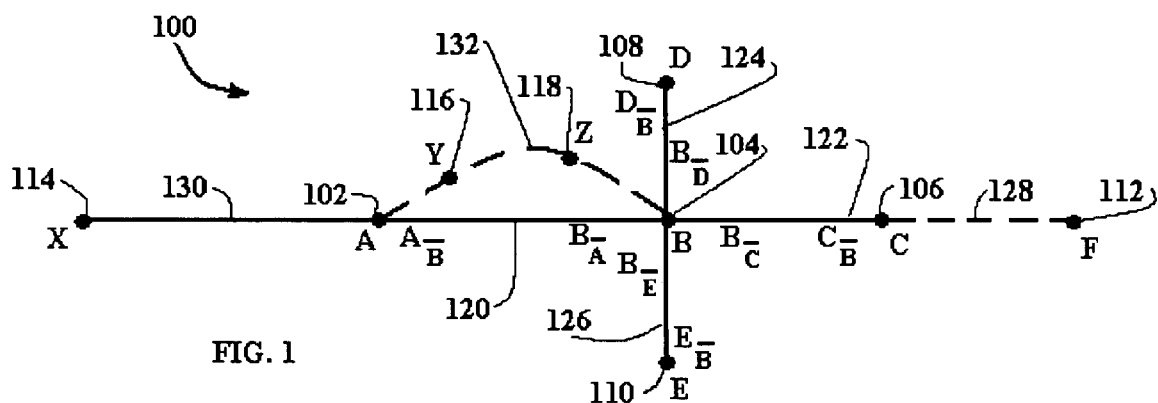
FIG. 1 is a representation of a network illustrating a method of advertising a repair path.
Figure 2:
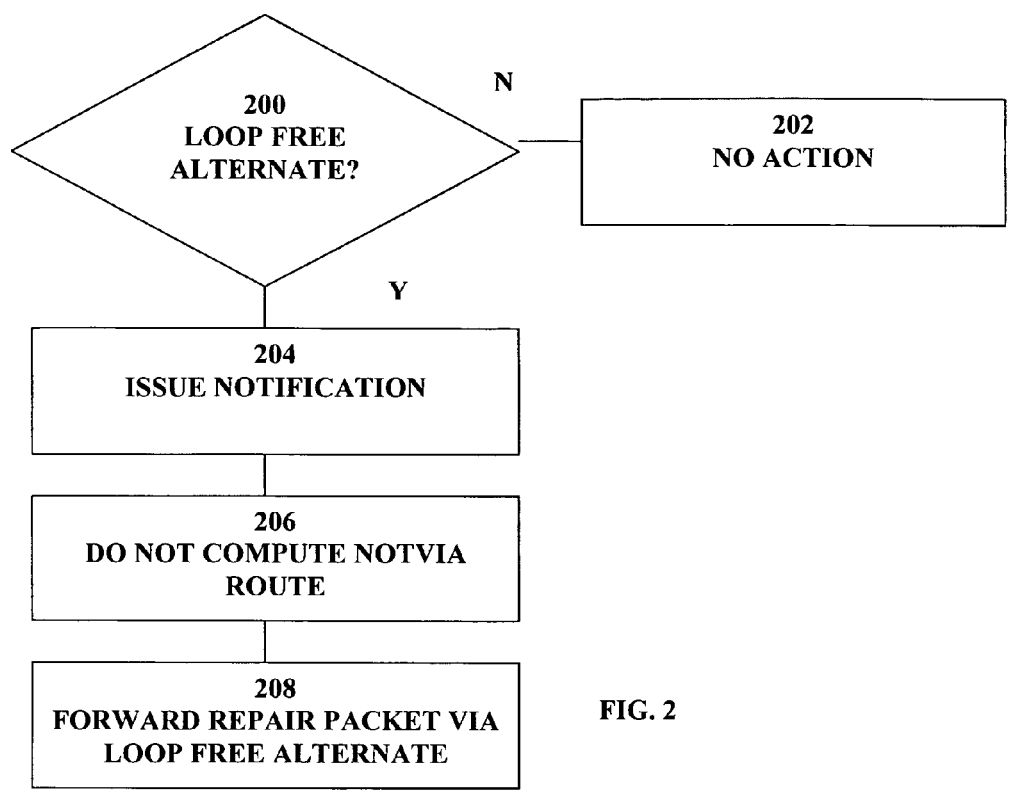
FIG. 2 is a flow diagram illustrating a method of advertising repair capability.

A method of advertising repair capability will be described with reference to the network of FIG. 1 although it will be appreciated that it can be applied to any appropriate network topology and network repair scheme using network repair addresses such as notvia addresses. The method can be further understood with reference to FIG. 2 which is a flow diagram illustrating steps carried out according to the method. At step 200 a notifying node, for example node A in FIG. 1, identifies whether it has an alternate repair path, for example a loop free alternate (LFA) path around a repairable component, here link 120 to node B. As is well known, an LFA comprises a path into which, once a packet has been injected, the packet will not loop back. Referring to FIG. 1, in fact the LFA shown corresponds to the notvia repair path 132 via nodes Y and Z to node B, and it can be shown that a calculated notvia path will correspond to an LFA, if one is available, or one of multiple LFAs. If no LFA is available then at step 202 node A takes no additional action and all nodes in the network calculate their notvia next hops for notvia address $B_{\overline{A}}$, as described in Shand et al.

However if an LFA such as repair path 132 is identified then at step 204 node A advertises its repair capability by issuing a corresponding notification. At step 206, all other nodes on the network, upon receipt of the notification, do not calculate their notvia paths and notvia addresses $B_{\overline{A}}$. Then, at step 208, upon failure of link 120 to node B, a notifying node, node A, simply forwards packets with next hop node B into LFA 132, with next hop node Y.

It will be seen that, as a result, packets sent via the LFA will be forwarded to node B and thence towards their destination without tunneling and without, by definition, looping back to node A. Accordingly, where there is an LFA, notvia addresses need not be calculated anywhere in the network—those nodes not in the repair path would not have used them anyway, and the nodes in the repair path do not need to use them either because they provide an LFA. As a result the number of computations needed is reduced as routers performing notvia route computations can omit computation for failed components for which an LFA is available. In fact it is found that a large proportion of network components can be protected using LFAs in typical network topologies meaning that notvia addresses need only be computed for the remaining cases.

Additional aspects and optimizations are discussed in more detail below. In particular it can be seen that the approach described can be extended to the case where the failed component is a node rather than a link, that is, the method applies to both link and node protection, and in relation to other types of repair path than LFA repair paths.

3.0 Method of Advertising Repair Capability

Figure 3:
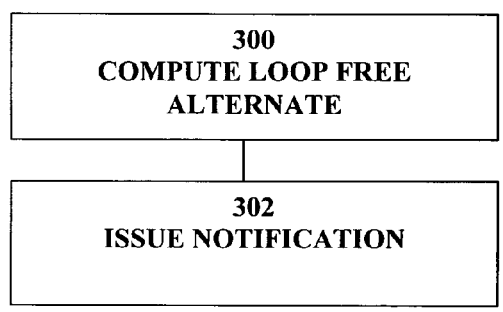
FIG. 3 is a flow diagram illustrating steps carried out at a notifying node in advertising link repair capability.

The methods described herein can be further understood with reference to FIG. 3 which is a flow diagram illustrating in more detail the steps performed at a notifying node neighbouring a repairable component, in a first case where a link is to be protected. In the following discussion reference is made to use of LFA repair paths on alternate repair paths. However it will be seen that similar approaches can be applied in relation to any other appropriate repair path.

At step 300 the notifying node (for example node A) computes any LFAs for the link. The manner in which LFAs are computed will be well known to the skilled reader and are described in "Basic Specification for IP Fast Reroute: Loop-free Alternates" which is available at the time of writing on the file "draft-ietf-rtgwg-ipfrr-spec-base-03.txt" in the directory "internet-drafts" of the domain "ietf.og" of the World Wide Web, and are not discussed here. In fact, as will be well known to the skilled reader, the approach of computing LFAs to protect components upon potential failure is commonly implemented such that this computation introduces no additional burden over existing approaches. It will be noted that the repairable component (for example link 120) should be fully protected by the LFA, that is to say, the notifying node A should be able to provide an LFA allowing reachability of all components downstream of the repairable component. For example it is sufficient to find an LFA to the next hop along the link, in this case, node B.

In step 302 the notifying node then sends out an appropriate notification. This notification should be sufficient that all nodes in the network receive it and recognize that it indicates that it is not necessary to compute the corresponding notvia address. In an optimization the notification takes the form of an LSP or an LSA. For example in an LSP, a type-length-value (TLV) field may be adopted such as TLV-22 corresponding to the link/adjacency and using the link-attribute sub TLV set to: LINK_LFA_PROTECTED. This is then set as a flag in the SPT against the corresponding component. It will be seen that, in the case of link protection, in fact nodes at both ends of the protected link will compute LFAs and send out corresponding notifications if available and both ends of the link may thus be flagged as protected in the SPT. Once again it will be seen that, in practice, it is beneficial to propagate the protection status of the link in any event if loop avoidance algorithms are to be implemented such that once again this step incurs no additional burden on the system.

Figure 4:
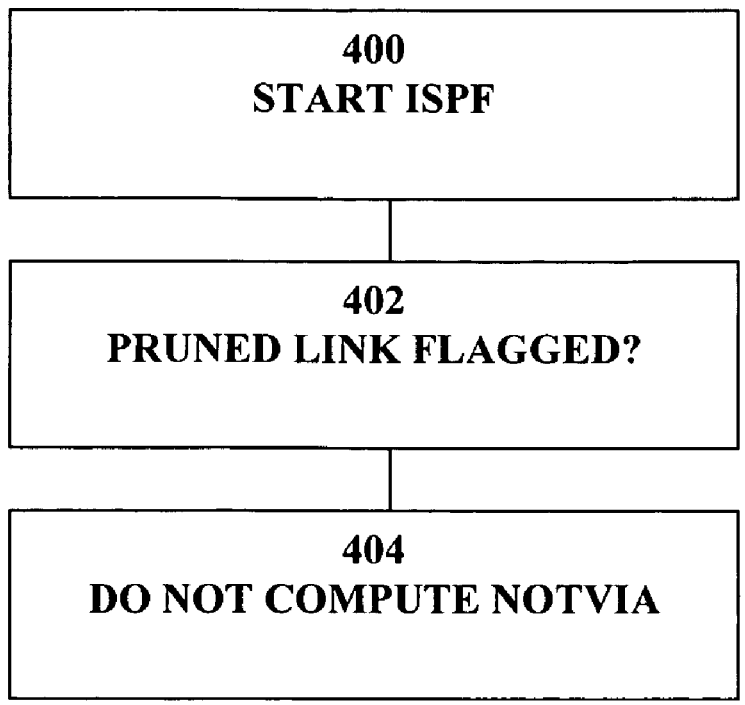
FIG. 4 is a flow diagram illustrating steps carried out at a constructing node in a method of advertising repair capability.

The steps carried out at a node receiving the notification, for example a constructing node such as node X in FIG. 1 can be understood with reference to FIG. 4 which is a flow diagram illustrating the relevant steps. At step 400, when the constructing node commences computing not-via addresses it will start an ISPF per not-via address pair (i.e. both ends of the link) to be computed. Each ISPF will be executed after the link to which the notvia addresses have been assigned has been pruned.

At the moment the link is considered for pruning the node checks whether the two ends of the link have been flagged with the link attribute: LINK_LFA_PROTECTED at step 402. If that is the case, then at step 404, the constructing node does not compute the notvia address. It will be appreciated that, in an implementation, it is not necessary to identify whether both ends of the link have been flagged as having an LFA by the notifying node. In some topologies it is possible that an LFA will be available in one direction (for example from node A to B repairing link 120) but not in the other direction (from node B to A repairing link 120). In that case the constructing node may only ensure that an LFA is available at the upstream end of the link in which case it will be possible to forward packets safely to that end after which they will be repaired using the LFA.

Figure 5:
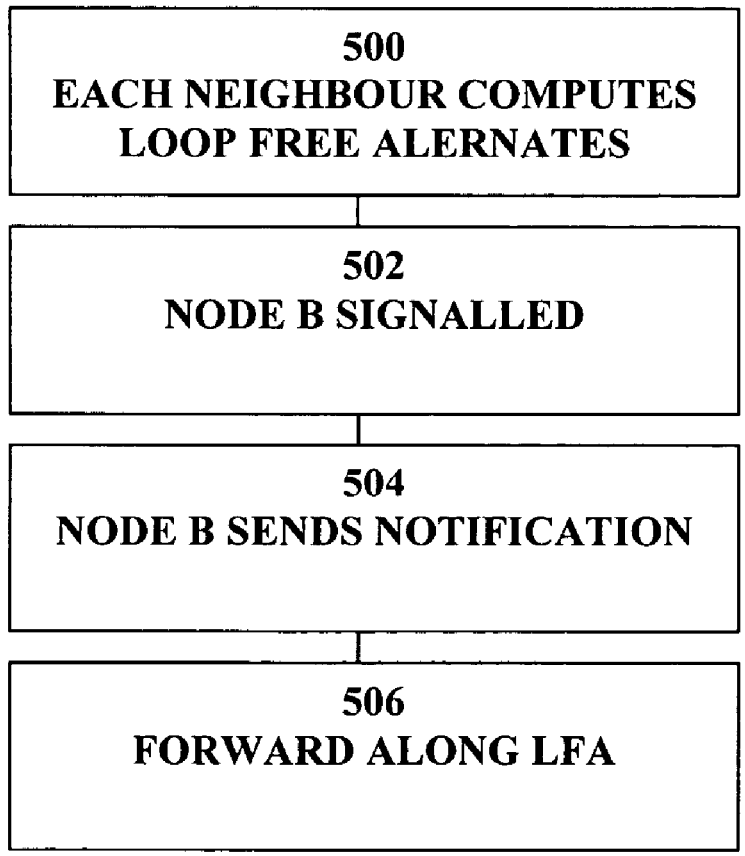
FIG. 5 is a flow diagram illustrating steps carried out in advertising node repair capability.

It will further be seen that the approaches described herein can extend to node protection as can be seen with reference to FIG. 5 which is a flow diagram illustrating the steps carried out at a notifying node for node protection. Referring once again to FIG. 1, where it is desired, for example, to protect node B as a repairable component then, at step 500 each neighbour node A, C, D, E first ensures that an LFA is available to each other node. Hence node A computes LFAs to nodes C, D, E, node C computes LFAs to nodes A, D, E and so forth.

Then, at step 502, the repairable component, node B establishes that all LFAs are available. Node B can acquire this knowledge, for example, through signaling using appropriate "hello" packets where, as soon as one of its neighbours A, C, D, E has found a LFA to each of node B's other neighbours, it signals this through a flag on the "hello" packet. Once node B has received the flag from all of its adjacent neighbours it can consider itself as fully protected and, at step 504, acting as notifying node, sends the corresponding notification to all nodes in the network in the manner discussed above. In this case, the capability can be advertised in any appropriate manner, for example, a sub TLV with a flag: NODE_PROTECTED in its LSP. The other nodes, acting as constructing nodes when reading node B's LSP will establish that the node is protected and will not compute any notvia address for node B in the manner generally described above with reference to FIG. 4. In subsequent operation, at step 506, when node A receives a packet for a destination with next hop node B it will simply put it into the appropriate LFA to the neighbour node of node B to which node B itself would have forwarded a packet.

It will be noted that, once again, it will be sufficient for other nodes in the network, upon receipt of the notification, to establish whether LFAs exist from the or each neighbour node to the repairable component along their route to the repairable component. For example node X merely needs to establish whether node A provides LFAs around node B. In a similar manner, if only a subset of all LFAs are in fact available around node B than node B may nonetheless advertise those LFAs of which it has been notified by its neighbours which may still reduce the computation at constructing nodes in the network to routes for which an LFA is not available.

In the case of multi-casting, use of the notvia address provides benefits in that it provides input interface information which can allow correct performance of the SPF check as described in more detail in U.S. application Ser. No. 11/175, 805, filed 5 Jul. 2005, of Stewart Bryant et al., entitled "Method and Apparatus for Constructing a Repair Path for Multicast Data." In this case, however, it can be shown that computation of the notvia address is still not required with respect to FIG. 6 and FIG. 7 which are, respectively, diagrams showing a FIB and multi-cast FIB (MFIB) at node Y in FIG. 1.

Referring firstly to FIG. 6 node Y's FIB 600 includes destination address column 602 and a next hop column 604. It will be seen that for destination node B a next hop of node Z has been computed. For destination $B_{\overline{A}}$, as discussed above, no next hop has been computed as node A has advertised LFA protection. Turning to MFIB 700 shown in FIG. 7 with, once again, a destination column 702 and a next hop column 704, for destination B, once again the next hop is node Z. In addition, for destination address $B_{\overline{A}}$, the next hop is also introduced as node Z. However it will be seen that this next hop does not require specific computation. This is because the normal next hop from node B along this path can be used and simply copied across from the FIB. Accordingly when node A receives a multi-cast packet it will tunnel it to notvia address $B_{\overline{A}}$, (in the case of link protection) and forward it to the next hop on the LFA which then has sufficient information to forward it accordingly. Upon receipt at node B the incoming interface can be identified from the notvia address allowing an SPF check to be carried out correctly and without packet loss.

It will be seen that, in a further optimization or alternative, a node having an associated link which is protected by a neighbour, or a node which itself is protected by all of its neighbours, may omit to send out a corresponding notvia address. As a result, the remaining nodes in the network do not need to compute their routes for that notvia address at all and additional notifications from the neighbouring nodes are not required. This may be achieved, for example, by signaling from the neighbour nodes to the protected node. An alternative possibility is that each node advertises, rather than its own notvia address for an interface, its neighbour node's notvia address for the corresponding interface such that, for example, node A would advertise $B_{\bar{A}}$, and node B would advertise A. In that case each node$_B$ will have identified whether LFA protection is available and can hence make its own decision as to whether or not to advertise the protected nodes notvia address. In that case each of the nodes simply needs to recognize that, for example, $B_{\bar{A}}$ belongs to node B even though advertised by node A and node B would also need to recognize that it owned $B_{\bar{A}}$ for example where traffic was tunneled to that address in order that it could be correctly decapsulated.

It can further be seen that the approach described herein can be supported in relation to local area networks (LAN) in which case a LAN connecting real nodes and a pseudo-node would, in an optimization, be treated as a point to point link.

It will be seen, therefore, that the approaches described above provide a significant reduction in computation requirements, even where FIB entries are completed for notvia addresses in the base SPF, as fewer ISPFs are required.

Although use of LFA paths as alternate repair paths ensures that existing repair computation can simply be re-used, it will be appreciated that any other appropriate repair mechanism supported by the network or relevant components thereof can be used. For example Equal Cost Multiple Paths (ECMP) where an equal cost path to that provided by the failed component exists, or a downstream path where the cost from the next hop on that path is less than that provided via the failed component, may be used. Indeed any repair may be used where the notifying node has a repair which can get a packet to the far side of a failed component without using a notvia repair, for example where a node identifies that a backup route is available of the type described in co-pending patent application Ser. No. 10/340,371, filed 9 Jan. 2003 entitled "Method and Apparatus for Constructing a Backup Route in a Data Communications Network" of Kevin Miles et al., the entire contents of which are incorporated herein by reference as if fully set forth herein.

The manner in which the method described herein is implemented in which software, firmware, hardware or any combination thereof and with any appropriate code changes as will be apparent to the skilled reader without the need for detailed description herein. For example extensions to the communication protocols such as the interior gateway protocol (IGP) may require extensions. In particular each enabled router that is directly connected to a protected network component will advertise a notvia address for that component in such a way that the association between the protected component and the notvia address can be determined by the other routers in the network as described above. Similarly nodes may associate "protection" flags with appropriate parts of the SPT in any appropriate manner. Furthermore, enabled routers may advertise their capability for calculating and implementing notvia routes in the IGP together with the type of encapsulation that they support, for example IP in IP, GRE, L2TPv3 all of which will be well known to the skilled reader.

The addresses assigned as notvia addresses can be any appropriate addresses for example taken from a private address space for the network.

Any appropriate encapsulation may be used to carry a notvia repair, for example IP in IP, GRE or L2TPv3. Similarly any alternate encapsulation scheme can be adopted as long as the encapsulating router and the router to which the encapsulated packet is addressed as repair point have a common ability to process the chosen encapsulation type.

4.0 Implementation Mechanisms—Hardware Overview

Figure 8:
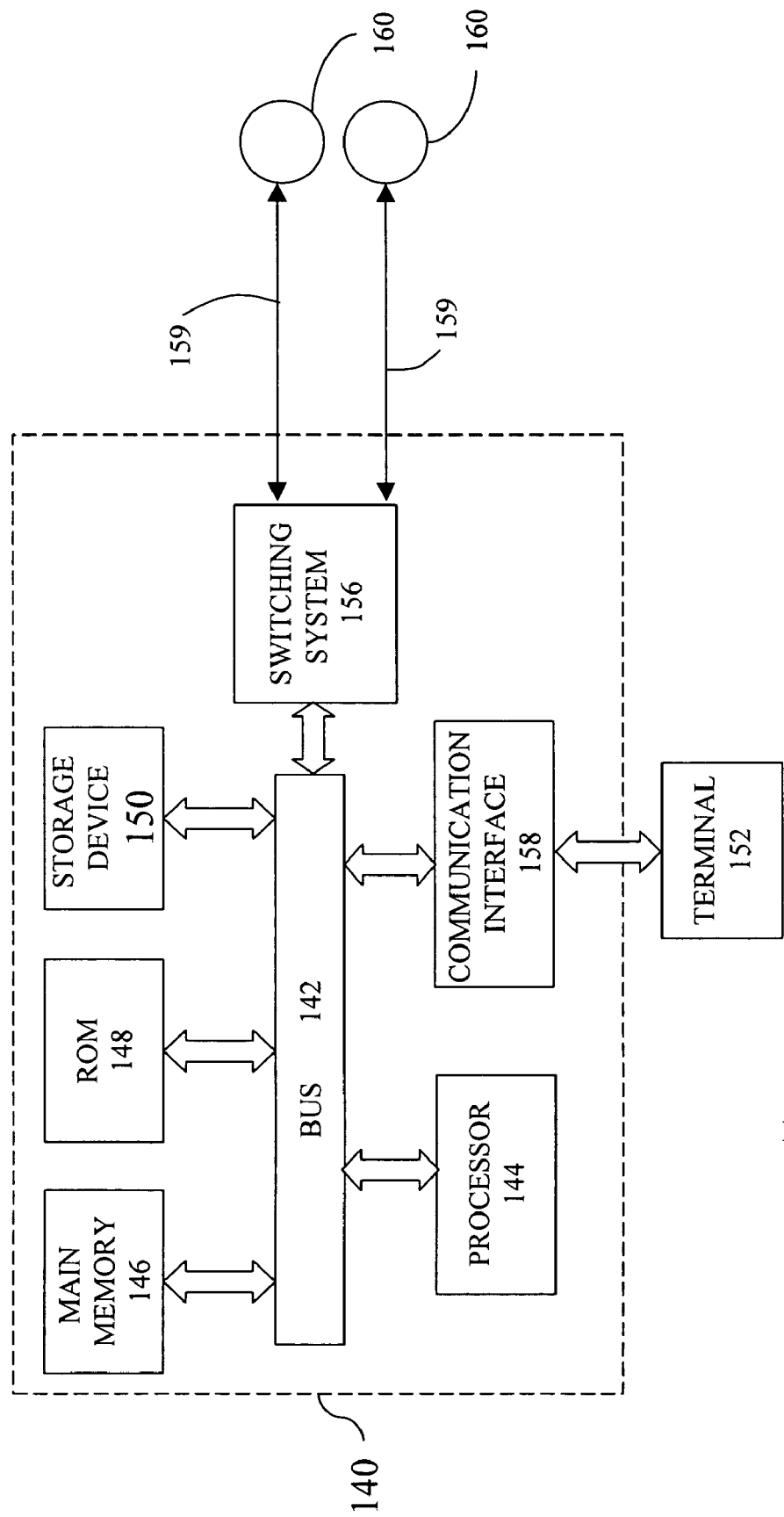
FIG. 8 is a block diagram that illustrates a computer system upon which a method for advertising repair capability may be implemented.

FIG. 8 is a block diagram that illustrates a computer system 40 upon which the method may be implemented. The method is implemented using one or more computer programs running on a network element such as a router device. Thus, in this embodiment, the computer system 140 is a router.

Computer system 140 includes a bus 142 or other communication mechanism for communicating information, and a processor 144 coupled with bus 142 for processing information. Computer system 140 also includes a main memory 146, such as a random access memory (RAM), flash memory, or other dynamic storage device, coupled to bus 142 for storing information and instructions to be executed by processor 144. Main memory 146 may also be used for storing temporary variables or other intermediate information during execution of instructions to be executed by processor 144. Computer system 140 further includes a read only memory (ROM) 148 or other static storage device coupled to bus 142 for storing static information and instructions for processor 144. A storage device 150, such as a magnetic disk, flash memory or optical disk, is provided and coupled to bus 142 for storing information and instructions.

A communication interface 158 may be coupled to bus 142 for communicating information and command selections to processor 144. Interface 158 is a conventional serial interface such as an RS-232 or RS-422 interface. An external terminal 152 or other computer system connects to the computer system 140 and provides commands to it using the interface 158. Firmware or software running in the computer system 140 provides a terminal interface or character-based command interface so that external commands can be given to the computer system.

A switching system 156 is coupled to bus 142 and has an input interface and a respective output interface (commonly designated 159) to external network elements. The external network elements may include a plurality of additional routers 160 or a local network coupled to one or more hosts or routers, or a global network such as the Internet having one or more servers. The switching system 156 switches information traffic arriving on the input interface to output interface 159 according to pre-determined protocols and conventions that are well known. For example, switching system 156, in cooperation with processor 144, can determine a destination of a packet of data arriving on the input interface and send it to the correct destination using the output interface. The destinations may include a host, server, other end stations, or other routing and switching devices in a local network or Internet.

The computer system 140 implements as a router acting as a notifying or constructing node in the above described method. The implementation is provided by computer system 140 in response to processor 144 executing one or more sequences of one or more instructions contained in main memory 146. Such instructions may be read into main memory 146 from another computer-readable medium, such as storage device 150. Execution of the sequences of instructions contained in main memory 146 causes processor 144 to perform the process steps described herein. One or more processors in a multi-processing arrangement may also be employed to execute the sequences of instructions contained in main memory 146. In alternative embodiments, hard-wired circuitry may be used in place of or in combination with software instructions to implement the method. Thus, embodiments are not limited to any specific combination of hardware circuitry and software.

The term "computer-readable medium" as used herein refers to any medium that participates in providing instructions to processor 144 for execution. Such a medium may take many forms, including but not limited to, non-volatile media, volatile media, and transmission media. Non-volatile media includes, for example, optical or magnetic disks, such as storage device 150. Volatile media includes dynamic memory, such as main memory 146. Transmission media includes coaxial cables, copper wire and fiber optics, including the wires that comprise bus 142. Transmission media can also take the form of wireless links such as acoustic or electromagnetic waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 144 for execution. For example, the instructions may initially be carried on a magnetic disk of a remote computer. The remote computer can load the instructions into its dynamic memory and send the instructions over a telephone line using a modem. A modem local to computer system 140 can receive the data on the telephone line and use an infrared transmitter to convert the data to an infrared signal. An infrared detector coupled to bus 142 can receive the data carried in the infrared signal and place the data on bus 142. Bus 142 carries the data to main memory 146, from which processor 144 retrieves and executes the instructions. The instructions received by main memory 146 may optionally be stored on storage device 150 either before or after execution by processor 144.

Interface 159 also provides a two-way data communication coupling to a network link that is connected to a local network. For example, the interface 159 may be an integrated services digital network (ISDN) card or a modem to provide a data communication connection to a corresponding type of telephone line. As another example, the interface 159 may be a local area network (LAN) card to provide a data communication connection to a compatible LAN. Wireless links may also be implemented. In any such implementation, the interface 159 sends and receives electrical, electromagnetic or optical signals that carry digital data streams representing various types of information.

The network link typically provides data communication through one or more networks to other data devices. For example, the network link may provide a connection through a local network to a host computer or to data equipment operated by an Internet Service Provider (ISP). The ISP in turn provides data communication services through the worldwide packet data communication network now commonly referred to as the "Internet". The local network and the Internet both use electrical, electromagnetic or optical signals that carry digital data streams. The signals through the various networks and the signals on the network link and through the interface 159, which carry the digital data to and from computer system 140, are exemplary forms of carrier waves transporting the information.

Computer system 140 can send messages and receive data, including program code, through the network(s), network link and interface 159. In the Internet example, a server might transmit a requested code for an application program through the Internet, ISP, local network and communication interface 158. One such downloaded application provides for the method as described herein.

The received code may be executed by processor 144 as it is received, and/or stored in storage device 150, or other non-volatile storage for later execution. In this manner, computer system 140 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

Any appropriate routing protocol and mechanism and forwarding paradigm can be adopted to implement the invention. The method steps set out can be carried out in any appropriate order and aspects from the examples and embodiments described juxtaposed or interchanged as appropriate. For example the method can be implemented using link state protocols such as intermediate system-intermediate system (IS-IS) or open shortest path first (OSPF), or routing vector protocols and any forwarding paradigm, for example MPLS. The method can be applied in any network of any topology and in relation to any component change in the network for example a link or node failure, or the introduction or removal of a network component by an administrator.

What is claimed is:

1. A method of advertising repair capability in a network repair scheme using network repair addresses for repairing around a repairable network component in a data communications network having, as components, nodes and links therebetween, the method comprising:

establishing, at a repairable node, whether an alternate repair path is available around a repairable component to the repairable node;

wherein the repairable component comprises a repairable link, and the repairable node is adjacent to the repairable component; and if such an alternate repair path is available, issuing, at the repairable node, a corresponding notification, comprising a link state packet (LSP) or a link state advertisement (LSA), to all remaining nodes in the network, wherein the notification comprises an attribute value that indicates that it is not necessary for the remaining nodes to compute another repair path for the repairable component.

2. A method as claimed in claim 1 in which a neighbour node to the repairable component other than the repairable node carries out the step of establishing whether an alternate repair path is available and, acting as notifying node, issues the corresponding notification.

3. A method as claimed in claim 2 in which the repairable node carries out the step of establishing whether an alternate repair path is available and, acting as notifying node, issues the corresponding notification.

4. A method as claimed in claim 3 in which the step of establishing comprises the step of receiving a notification from a neighbour node that an alternate repair path is available around the repairable node.

5. A method as claimed in claim 4 in which the repairable node issues the corresponding notification upon receipt of notification from all neighbour nodes that alternate repair paths are available to all other neighbour nodes.

6. A method as claimed in claim 1 in which the corresponding notification comprises one of a link state packet or link state advertisement component.

7. A method as claimed in claim 1 further comprising receiving, at a constructing node, a corresponding notification and omitting construction of a repair path for the corresponding repair address.

8. A method as claimed in claim 1 in which the corresponding notification comprises a notification signal.

9. A method as claimed in claim 8 in which the notification signal is received at a node comprising a repairable component and the repairable node, upon receipt of the notification signal, omits the advertisement of a corresponding network repair address.

10. A method as claimed in claim 1 further comprising the steps, performed at a node in an alternate repair path, of computing a network repair address next hop in a multi-cast forwarding table.

11. A method as claimed in claim 10 in which the network repair address next hop comprises the alternate repair path next hop.

12. A method as claimed in claim 1 in which the alternate repair path comprises a loop-free alternate (LFA) repair path.

13. A method as claimed in claim 1 in which a neighbour node to a repairable component advertises repair addresses for repairing around the repairable component; and the neighbour node omits the advertisement of a corresponding network repair address if an alternate repair path is available from the neighbour node around the repairable component.

14. A method of constructing forwarding information in a data communications network having, as components, nodes and links therebetween in a network repair scheme using network repair addresses for repairing around a failed network component, the method comprising:

in response to issuing, at a repairable node, a notification, comprising a link state packet (LSP) or a link state advertisement (LSA), to all remaining nodes in the network, wherein the notification comprises an alternate path for a repairable component, wherein the notification comprises an attribute value that indicates that it is not necessary for the remaining nodes to compute another repair path for the repairable component:

receiving the notification that the alternate repair path is available around the repairable component and, upon receipt of such a notification, omitting construction of another repair path for the repairable component.

15. A computer readable volatile or non-volatile storage medium storing one or more sequences of instructions which, when executed by one or more processors, causes for one or more processors to perform the steps of:

establishing, at a repairable node, whether an alternate repair path is available around a repairable component to the repairable node;

wherein the repairable component comprises a repairable link, and the repairable node is adjacent to the repairable component; and if such an alternate repair path is available, issuing, at the repairable node, a corresponding notification, comprising a link state packet (LSP) or a link state advertisement (LSA), to all remaining nodes in the network, wherein the notification comprises an attribute value that indicates that it is not necessary for the remaining nodes to compute another repair path for the repairable component.

16. An apparatus comprising:
one or more processors; and
a network interface communicatively coupled to the one or more processors and configured to communicate one or more packet flows among the one or more processors in a network and a computer readable volatile or non-volatile storage medium storing one or more sequences of instructions which, when executed by the one or more processors, cause the one or more processors to perform the steps of:

establishing, at a repairable node, whether an alternate repair path is available around a repairable component to the repairable node;

wherein the repairable component comprises a repairable link, and the repairable node is adjacent to the repairable component; and if such an alternate repair path is available, issuing, at the repairable node, a corresponding notification, comprising a link state packet (LSP) or a link state advertisement (LSA), to all remaining nodes in the network, wherein the notification comprises an attribute value that indicates that it is not necessary for the remaining nodes to compute another repair path for the repairable component.

17. An apparatus for advertising repair capability in a network repair scheme using network repair addresses for repairing around a repairable network component in a data communications network having, as components, nodes and links there between, the apparatus comprising:

means for establishing, at a repairable node, whether an alternate repair path is available around a repairable component to the repairable node; wherein the repairable component comprises a repairable link, and the repairable node is adjacent to the repairable component; and means for issuing, at the repairable node, a corresponding notification, comprising a link state packet (LSP) or a link state advertisement (LSA), to all remaining nodes in the network, the corresponding notification comprising an attribute value indicating that it is not necessary for the remaining nodes to compute another repair path for the repairable component, if the alternate repair path is available.

18. A method of constructing a repair path around a non-available component in a data communications network having, as components, nodes having a network address and links therebetween, the methods comprising the steps, performed at a participating node, of: receiving, from a node in the network, a notification, comprising a link state packet (LSP) or a link state advertisement (LSA), the notification identifying a repairable node and repairable components through which the repairable node is reachable; deriving from the notification, a network repair address for use in the event of non-availability of a repairable component identified in the notification; wherein the notification comprises an attribute value that indicates that it is not necessary for remaining nodes to compute another repair path for the repairable component; wherein the repairable component comprises a repairable link, and wherein the repairable component is adjacent to the repairable node; and using the network repair address from the notification, constructing a repair path for the component identified in the notification.

19. A computer readable volatile or non-volatile storage medium of claim 15, in which a neighbour node to the repairable component carries out the step of establishing whether an alternate repair path is available and, acting as notifying node, issues the corresponding notification.

20. A computer readable volatile or non-volatile storage medium of claim 19, in which the repairable node carries out the step of establishing whether an alternate repair path is available and, acting as notifying node, issues the corresponding notification.

21. A computer readable volatile or non-volatile storage medium of claim 20, in which the step of establishing comprises the step of receiving a notification from a neighbour node that an alternate repair path is available around the repairable node.

22. An apparatus of claim 16, in which a neighbour node to the repairable component carries out the step of establishing whether an alternate repair path is available and, acting as notifying node, issues the corresponding notification.

23. An apparatus of claim 22, in which the repairable node carries out the step of establishing whether an alternate repair path is available and, acting as notifying node, issues the corresponding notification.

24. An apparatus of claim 23, in which the step of establishing comprises the step of receiving a notification from a neighbour node that an alternate repair path is available around the repairable node.

25. An apparatus of claim 17, in which a neighbour node to the repairable component carries out the step of establishing whether an alternate repair path is available and, acting as notifying node, issues the corresponding notification.

26. An apparatus of claim 25, in which the repairable node carries out the step of establishing whether an alternate repair path is available and, acting as notifying node, issues the corresponding notification.

27. An apparatus of claim 26, in which the step of establishing comprises the step of receiving a notification from a neighbour node that an alternate repair path is available around the repairable node.

* * * * *